Figure 1:
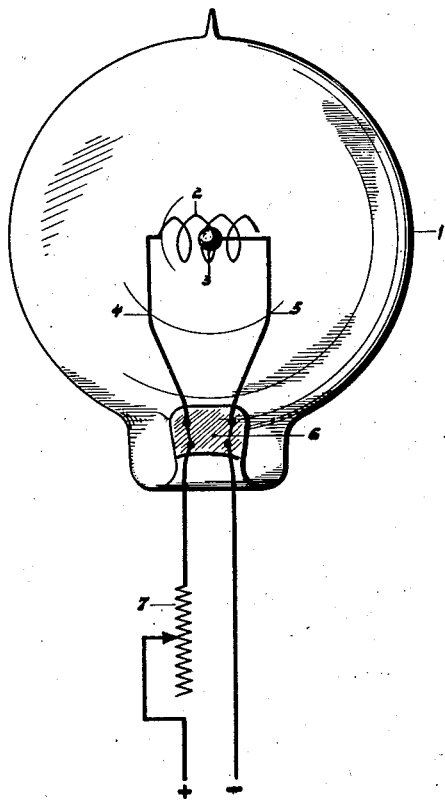

May 4, 1926.

G. HOLST ET AL 1,583,593

DISCHARGE TUBE WITH INCLOSED ARC DISCHARGE

Filed Sept. 26, 1922

Inventors.
Gilles Holst, Ekko Oosterhuis and Johannes Bruijnes
C. T. & J. F. Brandenburg
Attorneys Patented May 4, 1926.

1,583,593

UNITED STATES PATENT OFFICE.

GILLES HOLST, EKKO OOSTERHUIS, AND JOHANNES BRUIJNES, OF EINDHOVEN, NETHERLANDS, ASSIGNORS TO NAAMLOOZE VENNOOTSCHAP PHILIPS' GLOEI-LAMPENFABRIKEN, OF EINDHOVEN, NETHERLANDS.

DISCHARGE TUBE WITH INCLOSED ARC DISCHARGE.

Application filed September 26, 1922. Serial No. 590,705.

*To all whom it may concern:*

Be it known that we, GILLES HOLST, EKKO OOSTERHUIS, and JOHANNES BRUIJNES, all subjects of the Queen of the Netherlands, residing at Eindhoven, in the Province of North-Brabant, in the Kingdom of the Netherlands, have invented certain new and useful Improvements in or Relating to Discharge Tubes with Inclosed Arc Discharges (for which we have filed applications in the Kingdom of the Netherlands on August 30, 1921, Serial 20,229, and on September 1, 1921, Serial 20,256), of which the following is a specification.

In discharge tubes with inclosed arc-discharge between fixed electrodes of a refractory material in a neutral gas, the life is determined by the rate of evaporation and disintegration of the electrodes. The character of the two phenomena and the conditions under which either occurs are as yet incompletely known and the reports issued on the subject are frequently incorrect.

We have recognized that whereas the evaporation increases steadily at a high temperature of the electrodes, disintegration on the contrary occurs only, if the temperature falls below a certain limit. It is possible to do away with this disintegration entirely or in part, by maintaining the cathode with the aid of outward auxiliary devices at a sufficiently high temperature e. g. by operating the same as an incandescent cathode.

According to the invention, the electrodes are shaped and arranged in such a way that their temperature does not fall whilst working to that of disintegration i. e. the temperature below which the emission of electrons is smaller than that corresponding with the strength of the normal current through the tube.

According to the present invention the electrodes may be constructed in such a way that the electrode acting temporarily as an anode conveys so much heat to the other electrode by radiation and conduction through the gas that the temperature does not fall to that of disintegration. To that end the electrodes may be shaped so that one electrode envelops the other to a large extent at those places where the arc-discharge is effected.

Incidental to this is the advantage that a great part of the evaporated and possibly still disseminated material passes from one electrode to the other. Such tubes may be constructed both for alternating and for continuous current. For tubes worked with alternating current it is sufficient in many cases to construct the electrodes in such a way that each electrode while functioning as an anode reaches such a high temperature that during the next half-period its temperature does not fall to disintegration temperature.

In the latter case, the construction of the tube may also correspond to those generally used for discharge-tubes with inclosed arc-discharge, having fixed electrodes of tungsten or the like. The conditions for the electrodes above referred to may then be obtained by suitably proportioning a resistance, choking coil or condenser, connected in series with the discharge tube. In so doing the current density at the electrodes, and consequently the temperature of the electrodes, is regulated and may be so chosen that each electrode during the time it is working as an anode reaches such a high temperature that during the following half period the temperature does not fall below the limit of disintegration. It will be apparent that the fluctuations of temperature of the electrodes depend on the composition and pressure of the gas filling and on the shape and position of the electrodes. A fluctuation of temperature between the limits according to the present invention may be obtained, however, with a gasfilling of known composition and generally used pressure, whereas the electrodes may be constructed, for instance, in known manner in the form of balls fastened to the ends of conducting wires. Supposing, for example, the discharge tube is provided with electrodes consisting of balls of tungsten fastened to the ends of conducting wires and spaced, say 1 mm. apart, the gasfilling consisting of neon or argon having a pressure of about 50 cm. of mercury, the object of the present invention may be obtained by connecting the tube to an alternating current of 50 periods and by suitably proportioning a resistance connected in series with the tube.

The temperature above indicated as the limit of disintegration may be easily determined for each material by measurement and calculation. For a discharge tube with tungsten electrodes the temperature may fluctuate, according to the invention, between about 2525° C. and 2725° C. when operating normally.

In the accompanying drawing two different embodiments of the present invention are shown, in which the electrodes are so constructed and arranged in heat interchange relation to each other, that their temperature is maintained above that of disintegration.

Fig. 1 represents a discharge tube having a closed envelope 1, which is filled with a neutral gas such as nitrogen, or with a rare gas such as neon or with a mixture of gases, the pressure of said gasfilling being in the neighborhood of 1 atmosphere, for example 50 cm. of mercury.

Within the envelope 1 the electrodes 2 and 3 are fastened to conducting wires 4 and 5, sealed into the stem 6 and outwardly connected to a suitable tension. If necessary a device, which is not shown in the drawing may be applied for temporarily increasing the voltage of the circuit, in order to initiate an arc discharge between the electrodes 2 and 3.

The electrodes may both consist of tungsten. The electrode 2 consists of a coiled wire which surrounds the electrode 3, consisting of a ball fastened to a wire of materially smaller diameter.

The electrodes are so connected to a source of direct current that the electrode 2 acts as an anode, the electrode 3 acting as a cathode.

When the arc-discharge is established, both electrodes are heated to incandescence, the current density being regulated by means of a resistance 7 connected in series with the electrodes.

The anode 2, surrounding the cathode 3, imparts heat to the latter so that by suitably proportioning the resistance 7, the temperature of the cathode 3 is maintained above that of distintegration.

Figure 2:
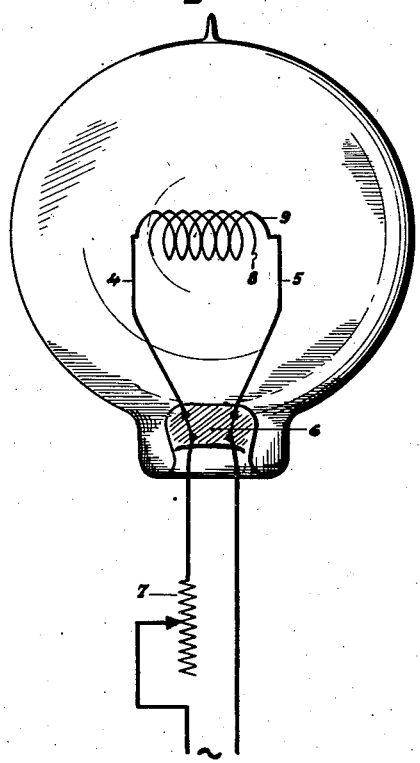

The embodiment, according to Figure 2, is suitable both for direct and alternating current. What has been said in relation to Fig. 1 for the gasfilling, the gaspressure and the resistance 7, also stands for the embodiment shown in Fig. 2, only the construction of the electrodes differing from that in Fig. 1.

The electrodes 8 and 9, which may consist of tungsten, are both shaped as coiled wires, having their windings positioned close to each other.

If the arc-discharge is effected between the electrodes, both are rendered incandescent and in the case the electrodes are connected to a source of alternating current, the electrode which temporarily acts as an anode imparts heat to the other electrode so that the temperature of both electrodes does not fall below the temperature of disintegration, being about 2800° absolute.

In both figures corresponding parts are indicated with corresponding reference numerals.

What we claim is:

1. The method of operating an arc discharge lamp, which consists in supplying an excess of energy to the anode above that theoretically necessary to maintain the arc, the excess energy imparting sufficient heat to the cathode to maintain said cathode above a minimum temperature of disintegration during operation.

2. The method of operating an arc discharge lamp, which consists in supplying an excess of energy to the anode and in transferring to the cathode a sufficient amount of the excess energy in the form of heat to maintain the cathode at a temperature between about 2525° C. and 2725° C.

3. The method of operating on alternating current a discharge tube with inclosed arc discharge, which consists in heating the electrodes, during the period of functioning as an anode, to such a temperature that said electrodes do not cool down below the temperature of disintegration during the period of functioning as a cathode.

4. An arc discharge lamp having discharge electrodes of a highly refractory material, said electrodes constructed and arranged in heat interchange relation to each other and to the anode of which an excess of energy is supplied to, thereby maintain their temperatures above that of disintegration during operation.

5. An arc discharge lamp having discharge electrodes constructed and arranged so that one largely envelops the other and to the anode of which an excess of energy is supplied, whereby heat is imparted from the anode to the cathode during operation, to thereby maintain the temperature of the cathode above the temperature of disintegration.

6. An electric discharge tube with inclosed arc discharge having electrodes of refractory material in an atmosphere of neutral gas, said electrodes being constructed and arranged so that upon supplying excess energy to the anode the electrode functioning as an anode imparts heat to the electrode functioning as a cathode, thereby maintaining the cathode temperature above that of disintegration.

In testimony whereof we affix our signatures.

GILLES HOLST.
EKKO OOSTERHUIS.
JOHANNES BRUIJNES.